UNITED STATES PATENT OFFICE.

JOHN S. BECKETT, OF CRANFORD, NEW JERSEY, ASSIGNOR OF ONE-HALF TO PERCIVAL R. MOSES, OF NEW YORK, N. Y.

RECOVERY OF ALKALI.

1,247,619.

Specification of Letters Patent.   Patented Nov. 27, 1917.

No Drawing.   Application filed April 24, 1916.   Serial No. 93,297.

*To all whom it may concern:*

Be it known that I, JOHN S. BECKETT, a citizen of the United States, residing at Cranford, county of Union, State of New Jersey, have invented certain new and useful Improvements in Recovery of Alkali; and I do hereby declare the following to be a full, clear, and exact description of the invention, such as will enable others skilled in the art to which it appertains to make and use the same.

This invention relates to the recovery of alkali metal compounds from insoluble alkali-containing materials such as alkali metal silicates, and more particularly to the recovery of potassium compounds from potassium-bearing materials such as feldspar and other potassium-containing silicate materials.

It has long been known that alkali metals could be recovered, substantially quantitatively, from complex silicates by heating the silicate with a basic material such as lime or limestone and with a fluxing agent such as calcium chlorid. Such a method was described by J. Lawrence Smith in volumes 15 and 16 of the *American Journal of Science* in 1853, and was even at that time a known method. According to this method, the silicate is heated with lime and calcium chlorid, or with lime and ammonium chlorid, until fusion takes place. The alkali metal is converted into the form of chlorid and can be recovered substantially quantitatively.

Many attempts have been made to recover potassium from feldspar, and alkali metals from other silicate material, in the form of alkali metal chlorids, according to the methods of J. Lawrence Smith referred to above, or according to methods involving minor modifications of this process. In such processes, when calcium chlorid, or other chlorid, is used as the fluxing agent and to furnish chlorin to combine with the alkali metal to form alkali metal chlorid, it is necessary to supply sufficient fluxing chlorid to convert all of the alkali metal of the silicate into chlorid, if it is desired to recover the alkali metal in this form either by extraction or by volatilization. In carrying out such a process on a commercial scale, the fluxing agent such as calcium chlorid or sodium chlorid which it is thus necessary to supply represents a considerable item of expense.

The present invention relates to an improvement upon such processes as those referred to and involves the recovery or regeneration of the chlorin, and re-use thereof for the treatment of further charges of the alkali metal silicates and for the production of further amounts of alkali metal chlorids.

The present invention further contemplates the conversion of the alkali metal chlorid into a more valuable product, as well as the recovery of the chlorin.

According to the present invention, the feldspar or other alkali-metal-bearing silicate or silicious material is heated with lime or limestone or their equivalents and with a fluxing material such as calcium chlorid, to a temperature sufficient to decompose the silicate and convert the potassium or other alkali metal into the form of chlorid. If the temperature is below that of volatilization, the alkali metal chlorid formed will be present in the product of the furnace operation in a water soluble form. If the temperature is sufficient to fuse the furnace charge and volatilize the alkali metal chlorid, it can be recovered in suitable apparatus. such as dust collectors and scrubbers, as a solid or in solution.

The details of the furnace operation can be varied within rather wide limits and it will be understood that various methods are available for carrying out the furnace operation, particularly with respect to the proportions of the lime or limestone and calcium chlorid, or their equivalents, the presence and amount of reducing agent when used, the nature of the fluxing agent, etc. Thus, if an easily fusible melt is desired, the charge may be proportioned so that it will have a composition approximating $(5R''O.3R'''_2O_3) (R''O.SiO_2)$ where $R''$ is a divalent metal such as calcium, and $R'''$ a trivalent metal such as aluminum, but these proportions are, of course, capable of considerable variation.

Instead of using lime or limestone as the basic material, other oxids, hydroxids or carbonates of the alkali earths can be used in a similar manner; for example, dolomite or dolomitic limestone can be thus utilized.

Where a chlorid flushing agent is used, such as calcium chlorid, the potassium chlorid is recovered at the end of the furnace operation either as a dry powder or in solution, or partly in a dry state and partly in solution. In either case, it is impure and usually contains considerable amounts of impurities of a nature which it is necessary to remove in order to make the product marketable.

Heretofore, it has been common to purify the alkali metal chlorid, such as potassium chlorid, and then to market the purified chlorid.

According to the present invention, the crude alkali metal chlorid can be brought into solution, treated with a reagent such as milk of lime or barium hydroxid or chlorid to precipitate the sulfates, and filtered from the insoluble matter and most of the sulfates. The solution can be cooled if necessary to effect a more efficient separation. Instead of crystallizing the alkali metal chlorid from the solution, as is usually done, the filtered solution can be at once electrolyzed to form the alkali metal hydroxid and chlorin, and the chlorin thus set free can be used to convert part of the potassium chlorid into the more valuable chlorate as well as to form calcium chlorid for further use as a fluxing agent.

When the alkali metal chlorid is thus converted into the form of chlorate, only part of the alkali metal compound can be recovered by crystallization. The remainder of the alkali metal compounds remain in solution, along with the calcium chlorid. According to the present invention, these alkali metal compounds which thus remain in solution, and which would normally be lost, are also returned to the process along with the calcium chlorid so that they will be recovered during the subsequent extraction and recovery of the alkali metal from the next charge. It will thus be noted that the process of the present invention involves a recovery of the chlorin in the form of calcium chlorid for use in the further carrying out of the process; that it involves a conversion of the alkali metal compounds at first recovered into a more valuable form, and that the alkali metal compounds thus formed, which would normally remain in solution uncrystallized and which would thus be lost in the waste liquors, are also recovered without added treatment for their recovery other than that of using them along with the calcium chlorid in the further carrying out of the process.

This aspect of the invention accordingly involves the recovery of compounds of the alkali metals from waste liquors composed mainly of material suitable for use as a fluxing agent in this process and containing notable quantities of these alkali metal compounds without any special treatment for their recovery. Accordingly, brines containing calcium salts, such as calcium chlorid residual liquors from various processes, or calcium chlorid waste liquors resulting as by-products from such processes as the Liebig chlorate process, and such brines as contain both calcium chlorid and alkalis, are of particular value. According to the present invention, there is recovered both the alkali metal contained in the brine or calcium chlorid residual or waste liquors, or other residual or waste material, and the alkali metal of the alkali metal silicate treated. This recovery becomes of particular value when combined with the recovery for re-use of the chlorin of the calcium chlorid.

Inasmuch as the alkali metal compounds resulting from the furnace operation are in an impure state, the treatment which results in their conversion into a more valuable condition and which also results in the regeneration of the chlorin, further effects the purification of the alkali metal compounds, giving these compounds in a purified state and eliminating the impurities. The recovery process of the present invention is accordingly a combined recovery and purification process, doing away with the separate purification process heretofore commonly practised.

A particularly valuable embodiment of the invention resides in the conversion of the alkali metal chlorid such as potassium chlorid, into the form of chlorate. This is effected by electrolyzing, in any suitable electrolytic apparatus, the solution of alkali metal chlorid obtained as the result of the furnace operation. The chlorin thus obtained is added to lime and alkali metal chlorid and the chlorate and calcium chlorid thus produced. Upon evaporation the chlorate is for the most part recovered in a crystallized state, while such portions as are not recovered are returned to the process along with the calcium chlorid. Where part of the alkali metal chlorid is thus converted into the chlorate, it will be evident that the amount of chlorin recovered as calcium chlorid for further use will require to be supplemented by fresh additions of calcium chlorid, in addition to such small amounts as may be necessary to make up for any losses incidental to the practice of the process.

If the proportion of the fluxing agent to the alkali metal in the furnace charge is less than the chemical equivalent, the alkali metal can be in part recovered as the chlorid and in part as the oxid or hydroxid, if a sufficient temperature is used, and sufficient limestone or other basic material is present to set free the alkali metal oxid. The basic element of the fluxing agent enters into the complex silicate and the acid element combines with the alkali metal, in chemically equivalent proportions, to form the alkali metal salt. Any alkali metal in excess of this amount is rendered available to a greater or less degree, as oxid or hydroxid, depending upon the character of the heat treatment, the amount of lime or limestone used, etc.

It is also a characteristic advantage of the invention, when the fluxing agent is formed by the interaction of lime or limestone and the alkali metal salt obtained from the furnace operation, and when the alkali metal compound formed is separated therefrom, by crystallization or leaching, that the fluxing agent, together with any contained alkali metal compounds, is in a wet condition, so that it can be used as a briqueting or agglomerating agent for the charge, if desired.

Where the alkali metal chlorid, is separated by volatilization from the furnace operation, it leaves the furnace at a high temperature and carries with it a very considerable amount of heat energy. This is particularly the case where the furnace operation is a blast furnace operation and where the furnace gases contain the products of combustion as well as the volatilized alkali metal compounds. This heat energy is made use of, according to one embodiment of the invention, in a waste heat boiler through which the furnace gases are passed. The volatilized compounds such as potassium chlorid do not tend to separate out to any appreciable extent in the flues or passages of such a boiler, while the gases nevertheless give up very considerable amounts of heat to the boiler and are in turn cooled to a temperature at which they can be more readily handled and the volatilized compounds recovered therefrom by dust catchers and scrubbers. Where the alkali metal chlorid is to be used for the production of chlorate, or where it is to be electrolyzed, or where other chlorid is to be used to furnish chlorin for the production of potassium chlorate and calcium chlorid the power generated in the waste heat boiler is available for use in the electrolytic operation. The process is thus in another sense a recovery process in that the waste heat of the furnace gases is recovered and utilized for promoting a subsequent step of the process.

Although the above examples embodying the use of calcium chlorid are described in some detail, it is to be understood that they are illustrative of methods of the general application of the process. The leading features of the process may be outlined as follows:—

First: a heat treatment in which a reaction is brought about between the alkali-metal-bearing silicious material and a basic material with the aid, if necessary, of a material suitable for use as a fluxing agent. The reaction may be facilitated, if desired, by fine grinding.

Second: Collection of the newly-formed alkali metal compounds.

Third: Recovery of the heat from the furnace gases, the heat thus recovered to be used preferably in the fourth step.

Fourth: A recovery process in which the acid element of the fluxing agents is recovered and in which the alkali metal compounds formed in the first step are usually converted into more valuable products.

Fifth: Any alkali metal compounds formed as in step No. 4, and which may not have been recovered from the flexing agent as produced in this same step, are recovered upon being returned to the furnace together with the fluxing agent in step No. 1.

The invention will be further illustrated by the following more specific description of a preferred embodiment thereof as applied to the treatment of feldspar or similar potassium-bearing silicate material. It will, however, be understood that the invention is of more or less general application to the recovery of alkali metals from silicates and the complex silicates of various natures in which the alkali metals are contained in an insoluble condition.

Orthoclase feldspar, is furnaced with limestone and calcium chlorid. The furnace operation may advantageously be carried out in a blast furnace similar to those used in the production of copper matte. The feldspar is crushed sufficiently for the blast furnace operation and this operation is carried out with coke as the heating material. The calcium chlorid is used in sufficient amount to serve as the fluxing agent and to supply the necessary chlorin for forming potassium chlorid. The amount of limestone can be varied within rather wide limits, but will in practice be used in such amounts as may be necessary or desirable for giving a melt of low fusion point or for furnishing a melt or sinter of a nature adapted for use for cement or for other purposes. The furnace product can also be thus made use of as a valuable by-product where it is desired to do so.

During the furnace operation, the feldspar is decomposed and combines with the limestone and calcium chlorid to form a complex silicate, while the chlorin of the calcium chlorid combines with the potassium content of the feldspar to form potassium chlorid which escapes with the furnace gases. These highly heated furnace gases are then passed through a waste heat boiler and their heat energy thus recovered in the form of power. The waste gases are then passed through cyclone dust separators where considerable amounts of the potassium chlorid are recovered in powder form; after which the waste gases pass to a scrubber in which the remaining potassium chlorid is dissolved. The solution thus obtained can be concentrated to crystallization of the potassium chlorid, which may then be separated centrifugally or otherwise or the solution can be used directly for the conversion of the potassium chlorid into other potassium compounds.

The residual melt is drawn off from the furnace to any suitable place of storage or use. When its composition is such that it is available for use as cement material, it may be granulated by the action of water according to familiar methods.

From 100 tons of orthoclase feldspar containing about 10% $K_2O$ (about 10 tons), there is about 15.8 tons of potassium chlorid produced. Where calcium chlorid is used, about 11.8 tons are necessary to furnish enough chlorin to combine with the potassium as potassium chlorid, or, where the commercial 75% calcium chlorid is used, about 15.8 tons are necessary. If all of the potassium chlorid is electrolyzed, this will give about 11.9 tons of caustic potash and about 7.5 tons of chlorin. If the chlorin is passed into a mixture of 2.6 tons of potassium chlorid and 7.8 tons of calcium hydroxid there will be produced about 4.3 tons of potassium chlorate and about 11.8 tons of calcium chlorid. On crystallization, about 20% of the potassium chlorate will remain in the mother liquors along with the calcium chlorid so that the actual yield of chlorate is only about 3.5 tons. The potassium chlorate thus remaining in solution and which would normally be thrown away with the mother liquors is returned to the process along with the calcium chlorid and there is thus recovered and supplied sufficient calcium chlorid for use in further furnace operations and at the same time considerable amounts of potassium which is recovered as potassium compounds along with the potassium of the feldspar treated. In the charge above referred to, there will be about 0.87 tons of potassium chlorid thus returned to the operation and recovered. The yield of potassium chlorid from the next batch will accordingly be increased to a corresponding degree.

It will thus be seen that the process of the present invention is a cyclic process in the sense that the chlorin which is supplied in the form of the fluxing agent, and which combines with the alkali to form alkali metal chlorid, is recovered and re-used in a cyclic manner. Limestone or lime is thus the only raw material which is necessary for the practice of the invention, in addition to the feldspar or other alkali metal silicate, and sufficient calcium chlorid or other fluxing agent to supply the chlorin necessary for the first series of furnace operations and to make up for such losses as are incidental to the practice of the process, and for such amounts of chlorin as may be finally recovered as potassium chlorate or other chlorin compound.

It will also be seen that the process of the present invention is cyclic in the sense that the alkali which is not recovered by crystallization according to methods heretofore practised, is returned to the cycle and recovered during a subsequent operation.

It will further be noted that the process of the present invention combines the recovery and regeneration of the chlorin, and the recovery of the alkali metal compounds, with the purification of the alkali metal compounds, so that the separate purification operation is not necessary.

I claim:

1. The method of recovering alkali metal compounds from alkali-metal-bearing silicates, which comprises heating the silicate with a basic material and with a chlorid to form separable alkali metal chlorids, separating the alkali metal chlorid thus formed, decomposing the same and recovering the chlorin in the form of a further amount of fluxing agent, and returning the flux thus formed to the furnace operation.

2. The method of recovering alkali metal compounds from alkali-metal-bearing silicates by subjecting the silicate with chlorid fluxing agents to a furnace operation, and of producing fluxing agents for use therein, which comprises decomposing alkali metal chlorids and combining the acid radical thereof with a suitable basic radical to form further amounts of fluxing agent in the presence of alkali metal compounds, and repeating the furnace operation with the fluxing agent thus produced.

3. The method of recovering alkali metal compounds from alkali-metal-bearing silicates by subjecting the silicate with chlorid fluxing agents to a furnace operation, and of producing chlorid fluxing agents for use therein, which comprises decomposing an alkali metal chlorid and combining the chlorin thereof with lime to form calcium chlorid in the presence of alkali metal compounds, separating the major portion of the alkali metal compound, and returning the calcium chlorid together with the unseparated alkali compound to the furnace operation.

4. The method of recovering alkali metal compounds from alkali-metal-bearing silicates by subjecting the silicate with chlorid fluxing agents to a furnace operation, and of producing fluxing agents for use therein, which comprises decomposing an alkali metal salt and combining the acid radical thereof with lime to form a calcium salt in the presence of alkali metal compounds, separating by crystallization the major portion of the alkali metal compound, and returning the calcium salt together with the uncrystallized alkali compound to the furnace operation.

5. The method of obtaining alkali metal compounds from calcium chlorid brines containing alkalis and alkali-metal-bearing silicates, which comprises heating the alkali-metal-bearing silicates and brine constituents to convert the alkali metal of the alkali-metal-bearing silicate into the form of separable alkali metal compounds, and recovering from the resulting product the said separable alkali metal compounds obtained from the silicate and from the brine.

6. The method of recovering alkali metal compounds by the decomposition of alkali-metal-bearing silicates with chlorid fluxing agents, and of purifying the alkali metal salts resulting from such decomposition, which comprises decomposing the alkali metal chlorid and combining the chlorin thereof with a suitable basic radical to form further amounts of the chlorid fluxing agent in the presence of alkali metal compounds, separating the major portion of the alkali metal compounds, and recovering the chlorid fluxing agent and any unseparated alkali metal compounds for further use.

7. The method of recovering alkali metal compounds by the decomposition of alkali-metal-bearing silicates with fluxing agents, and of purifying the alkali metal salts resulting from such decomposition, which comprises decomposing the alkali metal salts and combining the acid radical thereof with a suitable basic radical to form further amounts of the fluxing agent in the presence of alkali metal compounds, separating by crystallization the major portion of the alkali metal compounds, and recovering the fluxing agent and uncrystallized alkali metal compounds for further use.

8. In the recovery of alkali metal compounds from alkali-metal-bearing silicates by heating the silicate with a basic material and with a fluxing agent whose acid element is capable of combining with the alkali metal to form separable alkali metal salts, the method of increasing the yield of recoverable alkali metal compounds, which comprises incorporating in the furnace charge residual or waste products containing notable quantities of alkali metal compounds and composed largely of substances suitable for use as the fluxing agent.

9. The method of effecting the recovery of potassium compounds from potassium-bearing silicates, which comprises heating the silicate with a basic material and with calcium chlorid to convert the potash into potassium chlorid, separating the potassium chlorid thus formed, recovering chlorin therefrom by electrolysis, treating lime and potassium chlorid with the chlorin thus recovered thereby forming potassium chlorate and also producing calcium chlorid, and heating further charges of the silicate with the calcium chlorid thus produced.

10. The method of effecting the recovery of potassium compounds from potassium-bearing silicates, which comprises heating the silicate with a basic material and with calcium chlorid to convert the potassium into potassium chlorid, separating the potassium chlorid thus formed, recovering chlorin therefrom by electrolysis, and treating lime and potassium chlorid with the chlorin thus obtained thereby forming potassium chlorate and also producing calcium chlorid for re-use in the process, separating the major portion of the potassium chlorate and returning the calcium chlorid and the unseparated potassium compounds to the furnace operation.

In testimony whereof I affix my signature.

JOHN S. BECKETT.